March 31, 1970   L. P. ERDMAN   3,503,189
TRACTOR-MOUNTED MOWERS
Filed Nov. 7, 1967   3 Sheets-Sheet 1

INVENTOR.
LEON P. ERDMAN
BY
John C. Thompson
ATTORNEY

INVENTOR.
LEON P. ERDMAN
BY
ATTORNEY

United States Patent Office 3,503,189
Patented Mar. 31, 1970

3,503,189
TRACTOR-MOUNTED MOWERS
Leon Paul Erdman, Beaver Dam, Wis., assignor to Deere & Company, Moline, Ill., a corporation of Delaware
Filed Nov. 7, 1967, Ser. No. 681,208
Int. Cl. A01d 35/26
U.S. Cl. 56—25.4                                    10 Claims

ABSTRACT OF THE DISCLOSURE

A belt driven rotary mower is suspended beneath a tractor by front and rear pairs of forwardly extending parallel draft links. The rear draft links are secured to the chassis of the tractor by quick connect and disconnect fastener means and the front draft links are secured to the mower by quick connect and disconnect fastener means. The forward end of the tractor has a pair of depending brackets provided with forwardly open slots and a mounting structure is supported from the brackets by transversely extending studs on the mounting structure disposed within the slots. The front draft links are pivotally connected to the mounting structure. The mounting structure also carries a pair of sheaves and the studs are retained within the slots by an endless flexible belt tensioned over the sheaves on the mounting structure, a forward drive sheave on the tractor and a driven sheave on the mower.

Field of the invention

This invention relates generally to agricultural implements, and more particularly to an improved structure for mounting a mower to the underframe of a tarctor between its front and rear wheels.

Cross reference to related application

This application discloses structure additionally disclosed in copending application Ser. No. 681,168, filed concurrently with this application.

Description of the prior art

In recent years, it has become common practice to mow lawns and other vegetation with rotary law mowers having one or more blades which rotate about a vertically extending axis. These mowers come in many different sizes from the conventional lawn mower which runs from 18 to 22 inches in width to large highway right-of-way mowers which may be of a width as great as 20 feet.

One of the more common forms of mower is adapted to be used with the lawn- or garden-type tractor having a horsepower range of from 5 to 15 HP, the mower generally being mounted to a mid-portion of the tractor between the front and rear wheels. These mowers may be driven in a variety of different ways. This invention relates generally to a belt drive type mower in which one end of the endless belt is secured to a drive sheave on the tractor, the other end being secured to the driven sheave on the tractor-mounted mower.

The mowers of this class are generally mounted for vertical movement between a normal raised transport position and a lowered working position. However, it is often desirable to remove the mower entirely as the tractor of this type may be used with many different types of implements, such as for example, snow blowers, grader blades, brooms, rotary tillers, and many other deivces too numerous to mention here. The prior art devices, while generally satisfactory, have not provided for rapid mounting and dismounting of the mower on the tractor.

Summary of the invention

It is a particular object of the present invention to provide a mounting structure for a rotary mower of the class described in which the mower may quickly be secured and disassembled from a lawn or garden tractor.

More particularly, it is an object of the present invention to provide a mounting structure for securing a mower having a driven sheave rotatable about a generally vertical axis to the belly of a tractor having a drive sheave rotatable about a generally fore-and-aft extending axis, the mounting structure including a pair of idler sheaves rotatable about a transversely extending axis, the idler sheaves being held in their assembled position by the tension of an endless belt which interconnects the drive and driven sheaves.

It is a further object of the present invention to provide a mower mounting structure in which the mower is secured to a tractor between the front and rear wheels by means of generally parallel draft links, the draft links being rapidly assembled and disassembled to their interconnecting structure.

These and other objects and advantages of this invention will be apparent to those skilled in the art after a consideration of the following detailed description, taken in conjunction with the accompanying drawings in which the preferred form of this invention is illustrated.

Description of the preferred embodiment

In the following description right-hand and left-hand reference is determined by standing to the rear of the tractor and facing the direction of travel.

Figure 1:
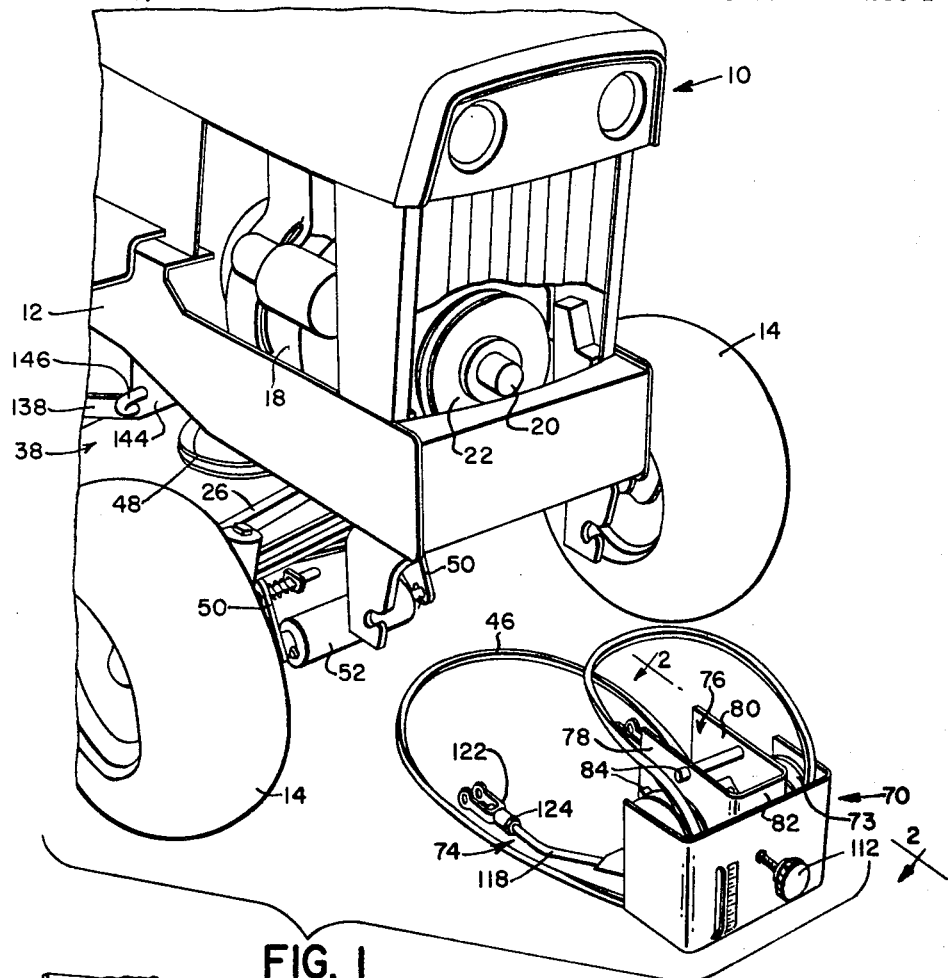
FIG. 1 is a perspective view of the forward portion of a tractor to which a mower is mounted, a portion of the mounting structure being shown disconnected from the tractor.
Figure 2:
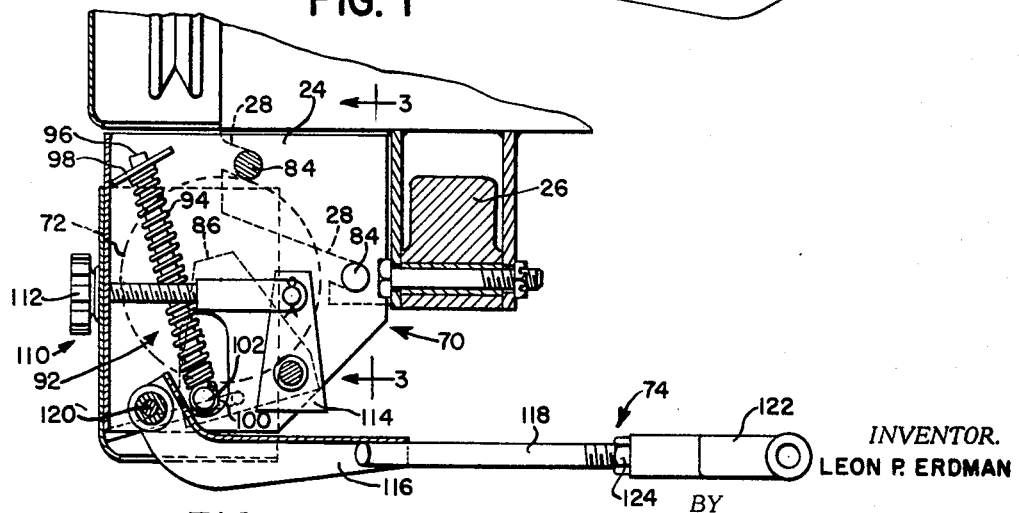
FIG. 2 is a section view of the belt idler assembly taken generally along the line 2—2 of FIG. 1.
Figure 3:
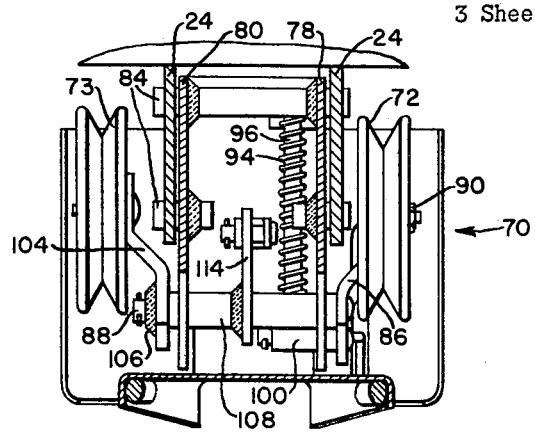
FIG. 3 is a view of the idler assembly taken along the lines 3—3 of FIG. 2.

The garden-type tractor 10 to which a mower may be secured by the improved mounting structure of this invention includes a longitudinally extending main frame 12 to which is secured front steerable wheels 14 and rear drive wheels 16. The tractor is equipped with an engine 18 having a forward output shaft 20 which rotates about a generally fore-and-aft extending axis, there being a drive sheave 22 mounted upon the output shaft 20. Secured to a forward portion of the tractor frame is a pair of longitudinally extending spaced apart plates 24 (FIG. 2), the plates being disposed forwardly of the axle 26 which carries the front wheels 14. The plates are provided with forwardly and upwardly extending slots 28.

Figure 5:
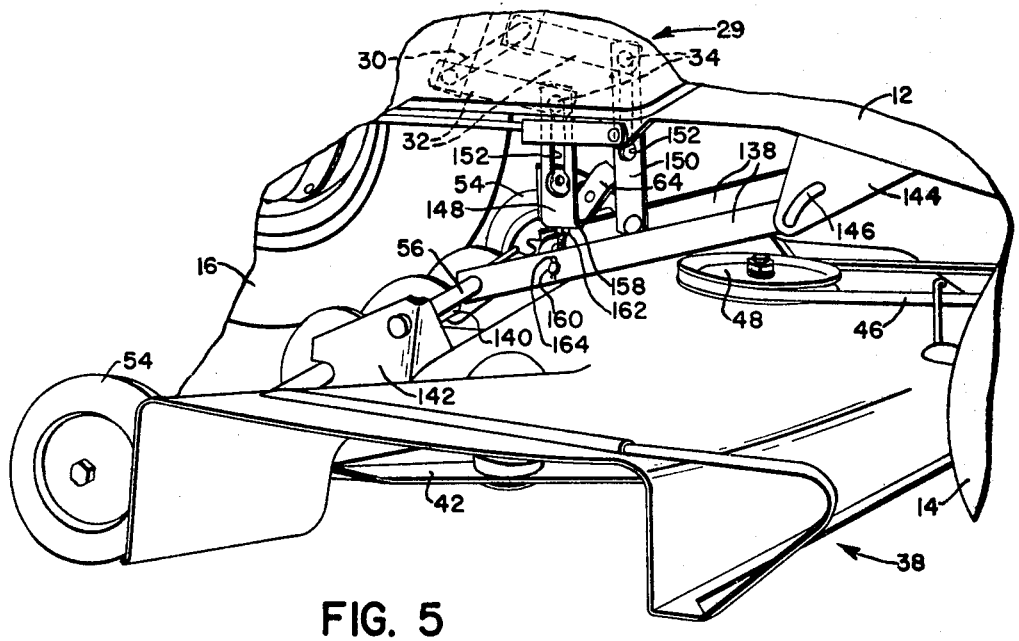
FIG. 5 is a perspective view of the mower secured to the midportion of the tractor, this view being taken from the right front side of the mower.

A lift arm assembly indicated generally at 29 in FIG. 5 is provided on the tractor, the lift arm assembly including a transverse rockshaft 30 journaled for rotation on a midportion of the tractor. Means are provided for rotating the rockshaft, and these means, while not material to the present invention, may include either hydraulic or manual means. A pair of lift arms 32 are secured to ends of the rockshaft 30, and the arms are provided at the remote ends with inwardly projecting buttonhead studs 34.

The mower, indicated generally at 38, includes a deck 40 which carries a plurality of rotatable blades 42 which are driven by a belt disposed below a shield member 44, the mower belt in turn being driven by an endless belt 46 which is interconnected with the drive sheave 22 on the tractor and drives the mower blade 42 through a driven sheave 48 adapted to rotate about a generally vertically extending axis. Carried by the forward end of the mower deck 40 is a pair of spaced apart depending arms 50 which carry at their lower forward end an anti-scalping roller 52.

Figure 6:
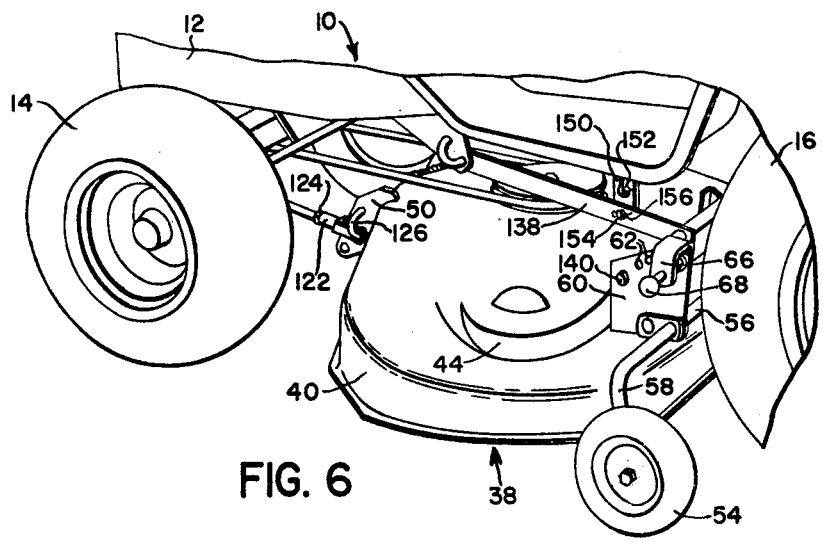
FIG. 6 is a view similar to FIG. 5, this view being taken from the left rear side of the mower.

A pair of anti-scalping wheels are carried to either side of the rear portion of the deck 40 and to this end the wheels 54 are mounted on a transversely extending rockshaft 56 which is journaled for rotation on the deck 40, there being rock arms 58 at the ends of the rockshaft to which the wheels 54 are rotatably secured. A sector plate 60 is suitably secured to the mower deck 40 and is provided with a plurality of apertures 62. An intermediate rock arm 64 (FIG. 5) is welded or otherwise secured to the rockshaft 56 and is provided with a J-shaped end portion 66 (FIG. 6) which carries a spring biased fastener 68 which may cooperate with the apertures 62 to hold the anti-scalp wheels 54 in various desired positions of adjustment.

To assist in mounting the mower 38 to the tractor 10, a forward mounting structure, indicated generally at 70, is provided which includes a pair of idler sheaves 72, 73 and front draft link means indicated generally at 74. The idler sheaves 72, 73 as well as the front draft link means 74 are both secured to a U-shaped support frame member indicated generally at 76, the frame having right and left legs 78, 80 interconnected by a generally transversely extending bight portion 82. Studs 84 are secured to the outer sides of the legs 78 and 80 and are received within the slots 28. The right-hand sheave 72 is carried for swinging movement by a triangular arm 86 one apical portion of which is interconnected with a pivot shaft 88 and another apical portion carrying a transversely extending bearing structure 90 about which the sheave 72 is rotatably secured. A spring assembly 92 is interconnected with still another apical portion of the triangular arm 86 and normally forces the sheave 72 to its forward position but permits rearward movement against the force of a spring 94. The spring 94 is disposed about a rod 96 one end of which passes through an apertured lug 98 secured to the member 76, the other end of the rod being welded to a sleeve 100 which is journaled for rotation about a transversely extending stud 102 welded to the aforesaid apical portion of the arm 86.

The left idler sheave is also mounted for fore-and-aft swinging movement and is carried by an arm 104 welded as at 106 to a transversely extending pivot sleeve member 108. The sleeve member 108 is disposed within transversely aligned apertures in the right and left legs 78, 80 and the pivot shaft 88 is disposed within the sleeve. A screw adjusting device 110 having a knob 112 is secured to an upstanding lug 114 welded on the shaft 108.

When the endless belt 46 is disposed over the drive sheave 22, the driven sheave 48, and the right and left idler sheaves 72, 73, the tension of the belt is used to hold the mounting structure 70 to the depending plates 24 on the tractor with the studs 84 disposed within the slots 28. To properly tension the belt, it is only necessary to rotate the knob to advance the left sheave 73 forwardly until the preloaded spring biased idler moves rearwardly. The manner of tensioning the belt is more fully set forth in copending application Ser. No. 681,168, filed concurrently with this application.

After the structure 70 has been mounted on the tractor with the studs 84 in the slots 28, the front draft link means 74 are secured to the mower. In this regard, it should be noted that the front draft link means 74 include a forward mounting assembly 116 to which the forward ends of draft links 118 are secured, the forward end of the forward mounting assembly 116 in turn being pivotally secured as at 120 to the U-shaped support frame member 76. Each of the draft links 118 is provided with a rearwardly extending bifurcated member 122 which is threaded on a rear portion of the arm 118, the bifurcated member being provided to adjust the length of the links 118 merely by rotating the member 122. The member 122 can be held in its adjusted position by means of a jam nut 124. The purpose of the adjustable length forward links is to provide for fore-and-aft leveling.

Figure 4:
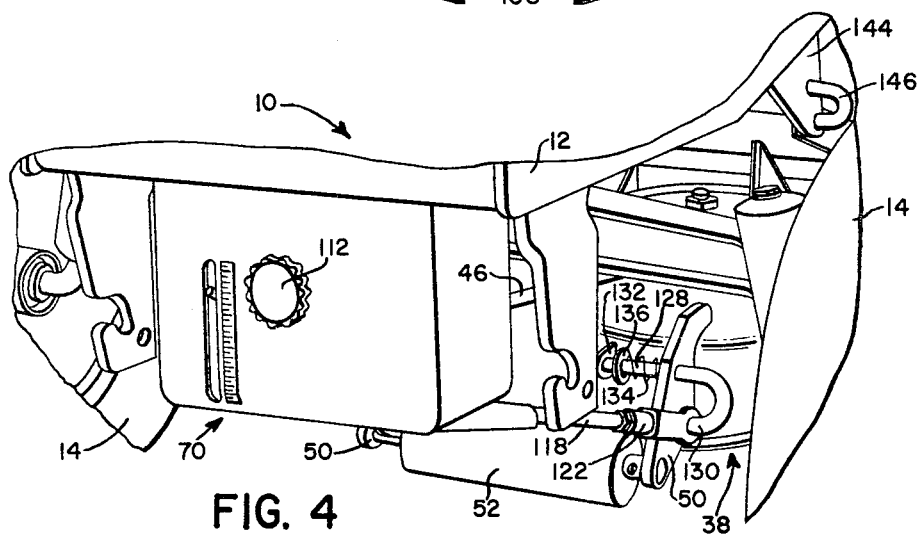
FIG. 4 is a perspective view showing the mounting structure secured to the tractor, and the mower in turn secured to the mounting structure.

First fastener means are provided for pivotally interconnecting the forward end of the mower deck 40 with the rear ends of the bifurcated members 122. The first fastener means includes a J-shaped bolt 126 (best shown in FIG. 4), each of the J-shaped bolts having a long leg 128 and a short leg 130. The long leg passes through a suitable aperture in the forward downwardly extending arm 50 and also within a suitable transversely aligned aperture in a lug member 132 welded inwardly of the arms 50 on the deck 40. A spring 134 is disposed about the long leg 128 between the arm 50 and lug 132 and bears against a washer 136 secured to the leg 128. The spring will thus bias the legs 128, 130 inwardly so that the short leg 130 will pass through an aperture carried by the plate 50. The short leg will thus also pass through the apertured bifurcated portion of the member 122 and act to secure it to the arm 50. It should be noted, however, that the bolt 126 can be pulled outwardly against the action of the spring 134 to quickly disconnect and also to reconnect the bifurcated member 122 to the arm 50.

Rear draft link means are also provided, these means serving to support the rear end of the mower 38. The rear draft link means includes right and left rear draft links 138, the rear ends of which are carried on a transversely extending rockshaft 140 for rotation about the axis of the rockshaft, the left end of the rockshaft 140 being carried by the sector plate 60 and the right end being carried by a member 142 secured to the deck 40 of the mower. The forward ends of the links 138 are apertured and secured to triangular plates 144 fastened to the side rails 12 of the tractor, each of the triangular plates being provided with second fastener means 146 which secure the apertured link 138 to a lower aperture in the plate 144, the link 138 being disposed between the plate 144 and an apertured hammer strap (not shown) and carried by the plate 144. The second fastener means are identical to the first fastener means and have a short leg 130 which passes through the forward aperture in the links 138 and the lower aperture in the plate 144. It should be apparent that it is only necessary to pull the fastener means 146 outwardly against the bias of springs 134 to permit connection or disconnection of the links 138 with the triangular plates 144.

The front and rear draft links 118, 138 are generally parallel to each other and serve to hold the mower 38 parallel to the tractor 10 as it is raised and lowered. To raise and lower the mower, lift link means are provided which include right and left links 148, 150 each of the lift links being provided with a keyhole slot 152. The left lift link 150 is provided with a transversely extending stud 154 (FIG. 6) which passes through a suitable aperture in the left rear draft link 138 and is secured thereto by means of a cotter pin 156. The right lift link 148 is provided with an inturned apertured portion 158 which carries a hook member 160, the hook member 160 being adjustable in length relative to the lift link 148 and securable in its adjusted position by means of upper and lower opposed jam nuts 162 (only one of which is shown). The hook end of the member 160 passes through a suitable aperture in the right rear draft link 138 and is secured thereto by means of a suitable pin 164.

To assemble the mower to the tractor, it is first necessary to connect the triangular plates 144 with the second fastener means 146 to the longitudinally extending frame 12 of the tractor, if this has not previously been done. The lift links 148, 150 are then secured to the rock arms 32 by passing the enlarged end of the keyhole slots 152 over the buttonhead studs 34, then moving the links 148 and 150 to the position shown in FIG. 5. The mounting structure 70 is then secured to the tractor 10 by disposing the studs 84 within the slots 28. The rear end of the forward lift links 118 and the forward end of the rear draft links 138 are then secured to the forward end of the mower deck and the triangular plates 144 by the first and second fastener means, respectively. The endless belt is then disposed over the drive and then driven sheaves. The mower is then raised and secured to the lift links 148, 150 by disposing the stud 154 and hook member 160 through the suitable apertures in the rear draft links and then securing the stud 154 and hook member 160 in place by means of the cotter pins 156 and 164. If the mower needs transverse leveling, this can be done by adjustably positioning the hook member 162 and if the mower needs fore-and-aft leveling, this can be done by lengthening or shortening the forward draft links 118 by means of the threaded bifurcated members 122. It is now only necessary to properly tension the belt 146 by rotating the knob 112 in the desired manner until the sheave 72 is held in a rearward position by the tension of the belt against the action of the spring 94.

By using the foregoing mounting structure, the mower may quickly be secured or disassembled from the garden tractor without the use of tools. In addition, the mower may be properly leveled both transversely and fore-and-aft to accommodate for various manufacturing tolerances.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

I claim:

1. In combination with a vehicle having a longitudinally extending frame supported by front and rear wheels and an implement adapted to be secured to the frame of said vehicle between said front and rear wheels by generally forwardly extending front and rear draft link means, said implement having a driven sheave rotatable about a vertically extending axis, said vehicle having a forward drive sheave rotatable about a fore-and-aft extending axis and a pair of depending transversely spaced forward mounting plates on the forward end of the vehicle, said forward mounting plates having forwardly opening slots, a forward mounting structure having a pair of sheaves mounted thereon forwardly of the driven and below the drive sheave for rotational movement about a transversely extending axis, transversely extending studs on said mounting structure disposed within said slots, and means serving to retain the studs on the mounting structure in the slots and to transmit torque from the drive sheave to the driven sheave, the means comprising an endless flexible belt tensioned over said sheaves.

2. The invention set forth in claim 1 in which the forward end of the front draft link means is pivotally secured to said mounting structure.

3. The invention set forth in claim 1 in which said pair of sheaves are movable to tension said endless belt.

4. In combination with a tractor and a mower adapted to be secured to the belly of the tractor, a mower mounting structure comprising: front draft link means having its forward end interconnected wih a forward portion of the tractor, rear draft link means, the rear end of which is swingably secured to the rear end of the mower, first quick connect and disconnect spring biased fastener means operable to swingably secure the forward end of the mower to the rear end of the forward draft link means for quick connection and disconnection, second quick connect and disconnect spring biased fastener means operable to swingably secure the forward end of the rear draft link means to an intermediate portion of the tractor for quick connection and disconnection, lift link means, means interconnecting the lift link means with the rear draft link means, and a lift arm assembly on the tractor, the lift link means being interconnected with the lift arm assembly.

5. The combination set forth in claim 4 in which said lift arm assembly comprises a transversely extending rockshaft rotatably journaled on said tractor, means operable to rotate said rockshaft, and a pair of lift arms secured at their ends to spaced apart portions of said rockshaft, the end of each of said lift arms being provided with transversely extending headed stud, said lift link means comprising a pair of links each having a keyhole slot disposable about said headed studs.

6. The combination set forth in claim 4 in which said lift link means comprises a pair of transversely spaced links, one of said links being adjustable in length to laterally level said mower.

7. In combination with a tractor and a mower adapted to be secured to the belly of the tractor, a mower mounting structure comprising: front draft link means interconnected with a forward portion of the tractor, rear draft link means, the rear end of which is swingably secured to the rear end of the mower, first fastener means operable to swingably secure the forward end of the mower to the rear end of the forward draft link means, second fastener means operable to swingably secure the forward end of the rear draft link means to an intermediate portion of the tractor, lift link means, means interconnecting the lift link means with the rear draft link means, and a lift arm assembly on the tractor, the lift link means being interconnected with the lift arm assembly, and said first and second fastener means comprise J-shaped bolts having short and long legs, aperture means on said mower and said tractor for securing the long leg portions of said first and second fasteners, respectively, and spring means engaging said long leg and biasing both of said legs into their associated apertures but permitting the short leg to be withdrawn from its aperture, the rear end of the front links and the front end of the rear links being formed with apertures cooperable with said apertures in the mower and tractor for receiving the short leg.

8. In combination with a tractor and a mower adapted to be secured to the belly of the tractor having a forward drive sheave rotatable about a fore-and-aft extending axis and a pair of forward mounting plates on its forward end, each of the plates having forwardly and upwardly opening slots, the implement having a driven sheave rotatable about a vertical axis, a mower mounting structure comprising: a forward mounting structure having a pair of sheaves mounted thereon for rotational movement about a transversely extending axis, outwardly extending studs on the mounting structure disposable in the slots in the mounting plates, an endless belt disposable over the sheaves and serving to hold the mounting structure on the tractor, front draft link means having its forward end secured to the forward mounting structure, rear draft link means having its rear end swingably secured to the rear end of the mower, first fastener means operable to swingably secure the forward end of the mower to the rear end of the forward draft link means, second fastener means operable to swingably secure the forward end of the rear draft link means to an intermediate portion of the tractor, lift link means, means interconnecting the lift link means with the rear draft link means and a lift arm assembly on the tractor, the lift link means being interconnected with the lift arm assembly.

9. The combination set forth in claim 8 in which one of said pair of sheaves is mounted to tension said belt, the other of said sheaves being spring loaded to maintain tension in said belt during a range of adjustment of said one sheave.

10. In combination with a tractor, a mower adapted to be secured to the belly of the tractor, a pair of anti-scalp wheels provided on the mower, the wheels being rotatably secured to a transversely extending rockshaft, an upwardly extending rock arm carried by said rockshaft, a sector plate fixed to said mower and having a plurality of apertures, spring biased fastener means carried by said rock arm and selectively positionable in said apertures whereby the height of said anti-scalp wheels may be varied, means for mounting the mower on the tractor, the mounting means including front draft link means having its forward end interconnected with a forward portion of the tractor, rear draft link means, the rear end of which is swingably secured to the rear end of the mower, first fastener means operable to swingably secure the forward end of the mower to the rear end of the forward draft link means, second fastener means operable to swingably secure the forward end of the rear draft link means to an intermediate portion of the tractor, lift link means, means interconnecting the lift link means with the rear draft link means and a lift arm assembly on the tractor, the lift link means being interconnected with the lift arm assembly.

References Cited

UNITED STATES PATENTS

| | | | |
|---|---|---|---|
| 2,533,804 | 12/1950 | Hitchcock | 56—25 |
| 2,945,338 | 7/1960 | Burrows et al. | 56—25.4 |
| 3,063,226 | 11/1962 | Pfauser | 56—25.4 |
| 3,077,065 | 2/1963 | Samways et al. | 56—25.4 |
| 3,107,472 | 10/1963 | Witt et al. | 56—25.4 |
| 3,245,209 | 4/1966 | Marek | 56—25.4 |

ANTONIO F. GUIDO, Primary Examiner